(12) United States Patent
Henrick (10) Patent No.: US 10,039,974 B2
(45) Date of Patent: *Aug. 7, 2018

(54) SUBSTITUTION OF GAME COMMANDS WITH DIFFERENT REPLACEMENT COMMANDS AT CLIENT DEVICES USING SUBSTITUTION REFERENCE SETS

(71) Applicant: Electronic Arts Inc., Redwood City, CA (US)

(72) Inventor: Clive Henrick, Castro Valley, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/276,764

(22) Filed: Sep. 26, 2016

(65) Prior Publication Data

US 2017/0014713 A1 Jan. 19, 2017

Related U.S. Application Data

(63) Continuation of application No. 13/677,024, filed on Nov. 14, 2012, now Pat. No. 9,452,350.

(51) Int. Cl.
*A63F 9/24* (2006.01)
*A63F 13/00* (2014.01)
(Continued)

(52) U.S. Cl.
CPC ............ *A63F 13/235* (2014.09); *A63F 9/24* (2013.01); *A63F 13/31* (2014.09); *A63F 13/35* (2014.09);
(Continued)

(58) Field of Classification Search
CPC ............ G07F 17/3202; G07F 17/3225; G07F 17/3227; A63F 13/20; A63F 13/23; A63F 13/235; A63F 2300/1018
See application file for complete search history.

(56) References Cited

U.S. PATENT DOCUMENTS

6,002,843 A 12/1999 Mochizuki
6,970,954 B1 11/2005 Guy
(Continued)

*Primary Examiner* — Milap Shah
*Assistant Examiner* — Jason Pinheiro
(74) *Attorney, Agent, or Firm* — Knobbe, Martens, Olson & Bear, LLP (57) ABSTRACT

Substitution of game commands with different replacement commands at client devices using substitution reference sets is provided. Substitution reference sets including first and second substitution reference sets may be obtained. The first substitution reference set may indicate substituting of a first command with a second command. The second substitution reference set may indicate substituting of the first command with a third command different from the second command. The first substitution reference set may be provided to a first client device. The second substitution reference set may be provided to a second client device. Responsive to the first substitution reference set being provided, requested game commands at the first client device that match the first command may be substituted with the second command. Responsive to the second substitution reference set being provided, requested game commands at the second client device that match the first command may be substituted with the third command.

14 Claims, 6 Drawing Sheets

(51) Int. Cl.
*G06F 17/00* (2006.01)
*G06F 19/00* (2018.01)
*A63F 13/235* (2014.01)
*G07F 17/32* (2006.01)
*A63F 13/35* (2014.01)
*A63F 13/42* (2014.01)
*A63F 13/31* (2014.01)
*A63F 13/20* (2014.01)
*A63F 13/23* (2014.01)

(52) U.S. Cl.
CPC .......... *A63F 13/42* (2014.09); *G07F 17/3202* (2013.01); *G07F 17/3225* (2013.01); *G07F 17/3227* (2013.01); *A63F 13/20* (2014.09); *A63F 13/23* (2014.09)

(56) References Cited

U.S. PATENT DOCUMENTS

| | | | |
|---|---|---|---|
| 7,375,833 B2 | 5/2008 | Miyata | |
| 8,401,899 B1* | 3/2013 | Kauchak | G06Q 30/0254 705/14.42 |
| 2002/0142846 A1* | 10/2002 | Paulsen | G06Q 30/0209 463/43 |
| 2003/0201982 A1* | 10/2003 | Iesaka | G06F 1/1616 345/168 |
| 2005/0170890 A1* | 8/2005 | Rowe | G07F 17/32 463/42 |
| 2008/0300061 A1* | 12/2008 | Zheng | A63F 13/10 463/42 |
| 2010/0113162 A1* | 5/2010 | Vemuri | G07F 17/3267 463/42 |
| 2011/0136568 A1* | 6/2011 | Buhr | A63F 13/22 463/29 |

\* cited by examiner

FIG. 1

| # | Command to be Substituted | Replacement Command |
|---|---|---|
| 1 | [Command X] | [Command X1] |
| 2 | [Command Y] | [Command Y1] |

FIG. 2A

| # | Command to be Substituted | Replacement Command |
|---|---|---|
| 1 | [Command X] | [Command X2] |
| 2 | [Command Z] | [Command Z2] |

FIG. 2B

| ID | Name | Command to be Substituted | Replacement Command | Action  New SET | |
|---|---|---|---|---|---|
| 1 | Substitution Reference Set 1 | [Command X] [Command Y] | [Command X1] [Command Y1] | Currently Activated  Deactivate  Modify  Remove | 310 302 306 308 |
| 2 | Substitution Reference Set 2 | [Command X] [Command Z] | [Command X2] [Command Z2] | Currently Activated  Deactivate  Modify  Remove | |
| 3 | Substitution Reference Set 3 | | | Currently Activated  Deactivate  Modify  Remove | |
| 4 | Substitution Reference Set 4 | [Command X] | [Command X4] | Currently Deactivated  Activate  Modify  Remove | 304 |
| 5 | Substitution Reference Set 5 | [Command Y] [Command Z] | [Command Y5] [Command Z5] | Currently Deactivated  Activate  Modify  Remove | |

SUBSTITUTION OF GAME COMMANDS WITH DIFFERENT REPLACEMENT COMMANDS AT CLIENT DEVICES USING SUBSTITUTION REFERENCE SETS

FIELD OF THE DISCLOSURE

This disclosure relates generally to substitution of commands (e.g., game commands) with different replacement commands at client devices using substitution reference sets.

BACKGROUND

Game development often entails continuous changes even after the game is released. For example, new game features may be added to a game, and current game features may be modified to facilitate better network resource utilization, to enhance game play for users, etc. These feature changes may, for instance, include changes to commands that are to be applied at client devices. For quality control purposes, engineers typically test out the changes before applying the changes for all users. These tests are generally performed by hardcoding command changes for a selected group of test users. However, such hardcoding techniques generally require a significant amount of work due to numerous tasks that must be duplicated for each test. While some testing solutions are coded at the server-side to mitigate the number of code changes needed on at the client-side, changes to code of the actual game are still generally performed at the server-side for each test. These and other drawbacks exist with testing of game commands, testing of other types of commands, and/or other tasks relating to feature changes.

SUMMARY

One aspect of the disclosure relates to a system configured to facilitate substitution of game commands with different replacement commands at client devices using substitution reference sets, in accordance with one or more implementations. This may facilitate split testing, client customization, system level client modifications, and/or other administrative functions. Making the substitutions on the client side may reduce server cost (e.g., in processing, storage, bandwidth, and/or other resources) of the modifications, may reduce modification (e.g., new or revised code) required for the applications and/or modules executed on the server, and/or provide other enhancements. In exemplary implementations, a server may store substitution reference sets, such as tables, vector lists, and/or other sets, that indicate various substitutions of one or more commands with respective replacement commands. The server may provide a first substitution reference set to a first client device, and a second substitution reference set to a second client device. The first substitution reference set may, for example, indicate that a first command is to be substituted with a second command. The second substitution reference set may indicate that the first command is to be substituted with a third command. The third command may, for instance, be different from the second command.

The first client device and/or the second client device may utilize their respective substitution reference sets to determine whether to substitute requested game commands (e.g., game commands requested based on action requests inputted by users, action requests inputted automatically by the game, etc.) with a replacement command by checking the respective substitution reference set. For example, the first and second client devices may originally be installed with a set of game commands. An original command game may be requested at the first client device. The requested game command may be intercepted to determine whether the requested game command matches a command in the first substitution reference set that is to be substituted (e.g., the first command). If the requested game command is determined to match a to-be-substituted command, the first client device may implement—in lieu of the requested game command—a replacement command (e.g., the second command) of the first substitution reference set that corresponds to the to-be-substituted command. In this way, game developers may utilize these substitution reference sets to avoid the need to hardcode command changes to the actual game (e.g., without hardcoding changes on the originally installed set of game commands at the client-side and/or corresponding code on the server-side). As such, game developers may more efficiently test command changes before determining whether to apply such command changes game-wide.

In some implementations, the system may include one or more servers. The server(s) may be configured to communicate with one or more client device(s) according to a client/server architecture. The users may access the system via the client device(s), for instance, to interact with one or more services.

The server(s) may be configured to execute one or more computer program modules to facilitate substitution of game commands with different replacement commands at client devices using substitution reference sets. The computer program modules may include one or more of a game module, a substitution reference manager module, a reference implementation module, a substitution record module, an impact monitoring module, a substitution administration module and/or other modules. The server(s) may include an electronic storage having electronic storage media that electronically stores information. For example, the electronic storage media may be non-transient electronic storage media storing individual substitution reference sets indicating substituting of game commands with replacement commands.

The game module may be configured to execute an instance of a game. The game may include users associated with client devices. The users may include a first user associated with the first client device and a second user associated with the second client device.

The substitution reference manager module may be configured to obtain substitution reference sets including first and second substitution reference sets (e.g., the substitution reference sets may be obtained from the electronic storage). The first substitution reference set may indicate substituting of a first command with a second command. The second substitution reference set may indicate substituting of the first command with a third command. The third command may, for instance, be different from the second command. In some implementations, the first, second, and third commands may relate to one or more features of the game.

The reference implementation module may be configured to: provide the first substitution reference set to the first client device; and provide the second substitution reference set to the second client device. Responsive to the first substitution reference set being provided to the first client device, requested game commands at the first client device may be compared with the first command. If a requested game command matches the first command, the first client device may substitute the requested game command with the second command (e.g., by implementing the second command in lieu of the requested game command). Responsive to the second substitution reference set being provided to the second client device, requested game commands at the second client device may be compared with the first command. If a requested game command matches the first command, the second client device may substitute the requested game command with the third command (e.g., by implementing the third command in lieu of the requested game command).

The substitution record module may be configured to maintain substitution records including first and second substitution records. The first substitution record may indicate that requested game commands at the first client device that match the first command are to be substituted with the second command. The second substitution record may indicate that requested game commands at the second device that match the first command are to be substituted with the third command.

The impact monitoring module may be configured to monitor an impact of substituting the first command with one or more of the second command or the third command. For example, in some implementations, the first and second client devices may be associated with a split test of one or more of the second command or the third command. An impact of the substitution may, for instance, be monitored by collecting user response information from users associated with the first client device, the second client device, and/or other client devices to enable analysis of the split test.

The substitution administration module may be configured to receive inputs from an administrator to implement one or more of adding of a new substitution reference set to the substitution reference sets, modifying of the first substitution reference set, modifying of the second substitution reference set, removing of the first substitution reference set from the substitution reference sets, or removing of the second substitution reference set from the substitution reference sets. By way of example, the substitution administration module may be configured to define a user interface for presentation to the administrator of the substitution reference sets, the user interface being configured to receive entry and/or selection of inputs that effectuate one or more of the adding of the new substitution reference set, the modifying of the first substitution reference set, the modifying of the second substitution reference set, the removing of the first substitution reference set, or the removing of the second substitution reference set.

In various implementations, the substitution administration module may be configured to receive inputs from the administrator to implement one or more of: deactivating of the first substitution reference set such that requested game commands at the first client device that match the first command may not be substituted with the second command; or deactivating of the second substitution reference set such that requested game commands at the second client device that match the first command may not be substituted with the third command.

The client device(s) may be configured to execute one or more computer program modules. The computer program modules may include one or more of a game expression module, a command substitution manager module, a command initiation module, a substitution determination module, and/or other modules. The client devices(s) may include an electronic storage having electronic storage media that electronically stores information. For example, the electronic storage media may be non-transient electronic storage media storing individual substitution reference sets indicating substituting of game commands with replacement commands. In certain implementations, the substitution reference sets may be obtained from a network service, preloaded on the electronic storage media prior to sale of the client device(s), and/or stored via other approaches.

The game expression module may be configured to execute an expression of a game. The game may include users associated with client devices. The users may include a first user associated with a first client device and a second user associated with a second client device. By way of example, an instance of the game may be running on the server-side. The expression of the game may be running on the client-side at the first client device. The expression may, for instance, be a version of the game instance running on the server side. The expression may receive information from the instance, such as information relating to a state of the game, information relating to future events in the game, and/or other information. The expression may react to information from the instance and user inputs received at the first client device. Various results may be generated from such reaction and may be provided to the server-side, which may verify the results with the instance of the game.

The command substitution manager module may be configured to obtain, at the first client device, a first substitution reference set indicating substituting of a first command with a second command. A second substitution reference set at the second client device may indicate substituting of the first command with a third command. As indicated, the third command may be different from the second command.

The command initiation module may be configured to initiate requests for implementation of game commands at the first client device. By way of example, requests for implementation of game commands may be initiated in response to action requests inputted by users, action requests inputted automatically by the game, and/or other requests inputted via other approaches.

The substitution determination module may be configured to substitute, based on the obtained first substitution reference set, a requested game command with the second command in response to the requested game command matching the first command. In certain implementations, the substitution determination module may be configured to, in response to substituting the requested game command with the second command, forward the second command for implementing of the second command. By way of example, upon the matching determination, the substitution determination module may forward the second command to one or more appropriate modules (e.g., the game expression module) within the first client device to implement the second command.

In various implementations, the substitution determination module may be configured to, in response to the requested game command not matching the first command, forward the requested game command for implementing of the requested game command. By way of example, upon the non-matching determination, the substitution determination module may forward the requested game command to one or more appropriate modules (e.g., the game expression module) within the first client device to implement the requested game command.

These and other features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
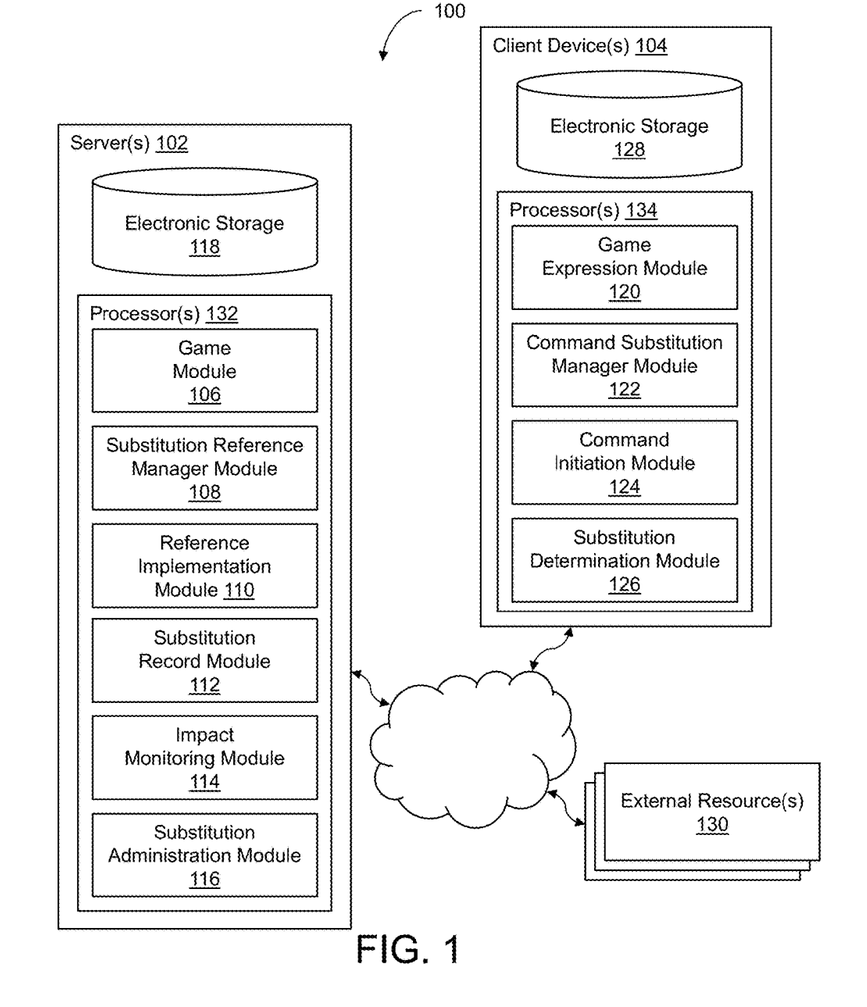
FIG. 1 illustrates a system configured to facilitate substitution of game commands with different replacement commands at client devices using substitution reference sets, in accordance with one or more implementations.

FIG. 1 illustrates a system 100 configured to facilitate substitution of game commands with different replacement commands at client devices using substitution reference sets, in accordance with one or more implementations. It should be noted that, while various implementations are described with respect to substitution of game commands, the approaches described herein may be applicable for substituting other types of commands. It should be noted that, while certain implementations are described with respect to testing of command changes, the approaches described herein may be applicable for command changes generally. In some implementations, system 100 may include one or more servers 102. Server(s) 102 may be configured to communicate with one or more client device(s) 104 according to a client/server architecture. The users may access system 100 via client device(s) 104, for instance, to interact with one or more services.

In exemplary implementations, server(s) 102 may store substitution reference sets, such as tables, vector lists, and/or other sets, that indicate various substitutions of one or more commands with respective replacement commands. Server(s) 102 may provide a first substitution reference set to a first client device 104, and a second substitution reference set to a second client device 104. The first substitution reference set may, for example, indicate that a first command is to be substituted with a second command. The second substitution reference set may indicate that the first command is to be substituted with a third command. The third command may, for instance, be different from the second command.

First client device 104 and/or second client device 104 may utilize their respective substitution reference sets to determine whether to substitute requested game commands (e.g., game commands requested based on action requests inputted by users, action requests inputted automatically by the game, etc.) with a replacement command by checking the respective substitution reference set. For example, first and second client devices 104 may originally be installed with a set of game commands. An original command game may be requested at first client device 104. The requested game command may be intercepted to determine whether the requested game command matches a command in the first substitution reference set that is to be substituted (e.g., the first command). If the requested game command is determined to match a to-be-substituted command, first client device 104 may implement—in lieu of the requested game command—a replacement command (e.g., the second command) of the first substitution reference set that corresponds to the to-be-substituted command. In this way, game developers may utilize these substitution reference sets to avoid the need to hardcode command changes to the actual game (e.g., without hardcoding changes on the originally installed set of game commands at the client-side and/or corresponding code on the server-side). As such, game developers may more efficiently test command changes before determining whether to apply such command changes game-wide.

Server(s) 102 may be configured to execute one or more computer program modules to facilitate substitution of game commands with different replacement commands at client devices using substitution reference sets. The computer program modules may include one or more of a game module 106, a substitution reference manager module 108, a reference implementation module 110, a substitution record module 112, an impact monitoring module 114, a substitution administration module 116 and/or other modules. Server(s) 102 may include an electronic storage 118 having electronic storage media that electronically stores information. For example, the electronic storage media may be non-transient electronic storage media storing individual substitution reference sets indicating substituting of game commands with replacement commands.

Game module 106 may be configured to execute an instance of a game. The game may include users associated with client devices. The users may include a first user associated with first client device 104 and a second user associated with second client device 104. In some implementations, the game may be associated with a virtual space. An instance of the game may, for example, be an instance of the virtual space. An instance of the virtual space may be executed by computer modules to determine views of the virtual space. The views may then be communicated (e.g., via streaming, via object/position data, and/or other information) from server(s) 102 and/or other source to client device(s) 104 for presentation to users. The view determined and transmitted to a given client device 104 may correspond to a user character being controlled by a user via client device 104. The view determined and transmitted to a given client device 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client device(s) 104) that present the views of the virtual space to a user. The simulated space may have a topography, express ongoing real-time interaction by one or more users, and/or include one or more objects positioned within the topography that are capable of locomotion within the topography. In some instances, the topography may include a 2-dimensional topography. In other instances, the topography may include a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other examples of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or one another. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client device(s) 104. The users may interact with one another through communications exchanged within the virtual space. Such communications may include one or more of textual chat, instant messages, private messages, voice communications, and/or other communications. Communications may be received and entered by the users via their respective client device(s) 104. Communications may be routed to and from the appropriate users through server(s) 102.

Substitution reference manager module 108 may be configured to obtain substitution reference sets including first and second substitution reference sets (e.g., the substitution reference sets may be obtained from electronic storage 118). The first substitution reference set may indicate substituting of a first command with a second command. The second substitution reference set may indicate substituting of the first command with a third command. The third command may, for instance, be different from the second command.

Figure 2A:
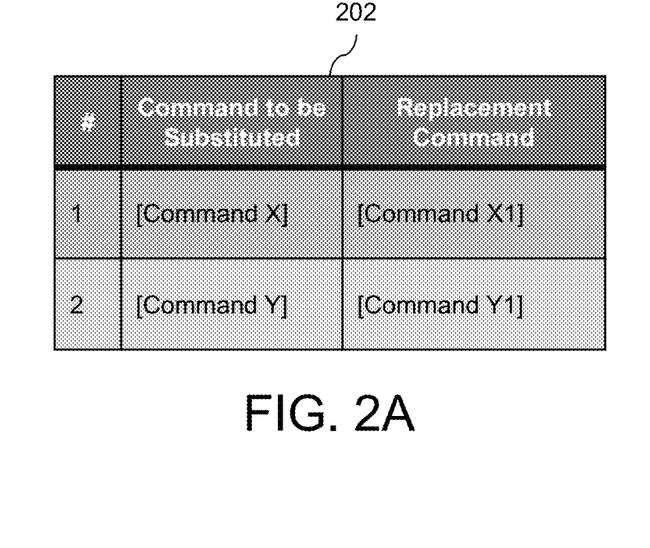
FIGS. 2A and 2B illustrate first and second substitution reference sets that may be provided to first and second client devices, respectively, in accordance with one or more implementations.
Figure 2B:
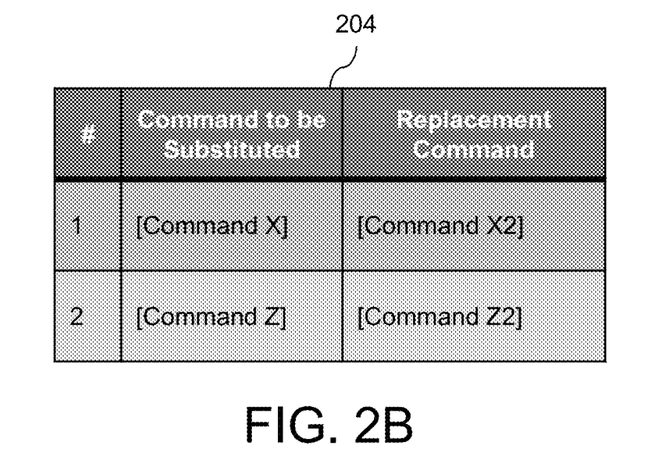

By way of example, FIGS. 2A and 2B illustrate first and second substitution reference sets 202 and 204 that may be provided to first and second client devices 104, respectively, in accordance with one or more implementations. As indicated, electronic storage 118 may store first and second substitution reference sets 202 and 204 along with other substitution reference sets. Substitution reference manager module 108 may obtain first and second substitution reference sets 202 and 204 from electronic storage 118. As shown, first and second substitution reference sets 202 and 204 indicate commands to be substituted along with respective replacement commands to substitute the to-be-substituted commands. First substitution reference set 202 indicates, for instance, that "[Command X]" is to be substituted with "[Command X1]," and that "[Command Y]" is to be substituted with "[Command Y1]." On the other hand, second substitution reference set indicates that [Command X" is to be substituted with "[Command X2]," and that "[Command Z] is to be substituted with "[Command Z2]."

Reference implementation module 110 may be configured to: provide the first substitution reference set to first client device 104; and provide the second substitution reference set to second client device 104. Responsive to the first substitution reference set being provided to first client device 104, requested game commands at first client device 104 may be compared with the first command. If a requested game command matches the first command, first client device 104 may substitute the requested game command with the second command (e.g., by implementing the second command in lieu of the requested game command). Responsive to the second substitution reference set being provided to second client device 104, requested game commands at second client device 104 may be compared with the first command. If a requested game command matches the first command, second client device 104 may substitute the requested game command with the third command (e.g., by implementing the third command in lieu of the requested game command).

In certain implementations, reference implementation module 110 may cause first client device 104 to substitute the second command for requested game commands that match the first command by providing the first substitution reference set to first client device 104. Reference implementation module 110 may cause second client device 104 to substitute the third command for requested game commands that match the first command by providing the second substitution reference set to second client device 104.

In some implementations, the first, second, and third commands may relate to one or more features of the game. Still referring to FIGS. 2A and 2B, for example, the first, second, and third commands may be "[Command X]," "[Command X1]," and [Command X2]," respectively. Implementation of "[Command X]" may be requested when a player requests a rental vehicle from a car shop within a game. Typically, based on such a request for "[Command X]," players may be given a Brand-A vehicle (e.g., to advertise vehicles for Brand-A company). In one scenario, after first client device 104 is provided with first substitution reference set 202 that indicates substituting of "[Command X]" with "[Command X1]," first client device 104 may initiate a request for implementation of "[Command X] in response to a player of first client device 104 requesting a rental vehicle from the car shop. However, the requested command may be intercepted (e.g., by a module within first client device 104), and "[Command X1]" may be implemented in lieu of "[Command X]." By implementing "[Command X1]," the player may be given a Brand-B vehicle (as opposed to a Brand-A vehicle) in response to the rental vehicle request.

In another scenario, after second client device 104 is provided with second substitution reference set 204 that indicates substituting of "[Command X]" with "[Command X2]," second client device 104 may initiate a request for implementation of "[Command X] in response to a player of second client device 104 requesting a rental vehicle from the car shop. However, the requested command may be intercepted (e.g., by a module within second client device 104), and "[Command X2]" may be implemented in lieu of "[Command X]." By implementing "[Command X2]," the player may be given a Brand-C vehicle (as opposed to a Brand-A vehicle) in response to the rental vehicle request. In this way, changes with respect to which vehicle is given to a player and/or changes with respect to other game features may be made to the game without unnecessary hardcoding of those changes to game code on the client-side, the server-side, etc.

Substitution record module 112 may be configured to maintain substitution records including first and second substitution records. The first substitution record may indicate that requested game commands at first client device 104 that match the first command are to be substituted with the second command. The second substitution record may indicate that requested game commands at the second device that match the first command are to be substituted with the third command. These substitution records may, for example, be utilized to identify and analyze user response information associated with substituting of various game commands with replacement commands. In one use case, with respect to testing of the replacement commands, such analysis may be utilized to determine whether the replacement commands should be applied outside the scope of a test (e.g., whether the replacement commands should be applied to a larger group of users, applied game-wide, etc.), to determine whether new replacement commands should be used in the test, and/or to make other determinations.

Impact monitoring module 114 may be configured to monitor an impact of substituting the first command with one or more of the second command or the third command. For example, in some implementations, the first and second client devices may be associated with a split test of one or more of the second command or the third command. An impact of the substitution may, for instance, be monitored by collecting user response information from users associated with first client device 104, second client device 104, and/or other client devices 104 to enable analysis of the split test. Such users may include test users (e.g., users associated with client devices 104 that apply replacement commands via substitution reference sets), control users, and/or other users. As an example, if the replacement commands relate to test changes to costs and/or risk of loss associated with a lottery within a game, the user response information may include user participation numbers, revenue generated from the lottery, and/or other response information for the various scenarios (e.g., test scenarios, control scenarios, etc.).

Substitution administration module 116 may be configured to receive inputs from an administrator to implement one or more of adding of a new substitution reference set to the substitution reference sets, modifying of the first substitution reference set, modifying of the second substitution reference set, removing of the first substitution reference set from the substitution reference sets, or removing of the second substitution reference set from the substitution reference sets. By way of example, substitution administration module 116 may be configured to define a user interface for presentation to the administrator of the substitution reference sets, the user interface being configured to receive entry and/or selection of inputs that effectuate one or more of the adding of the new substitution reference set, the modifying of the first substitution reference set, the modifying of the second substitution reference set, the removing of the first substitution reference set, or the removing of the second substitution reference set.

Figure 3:
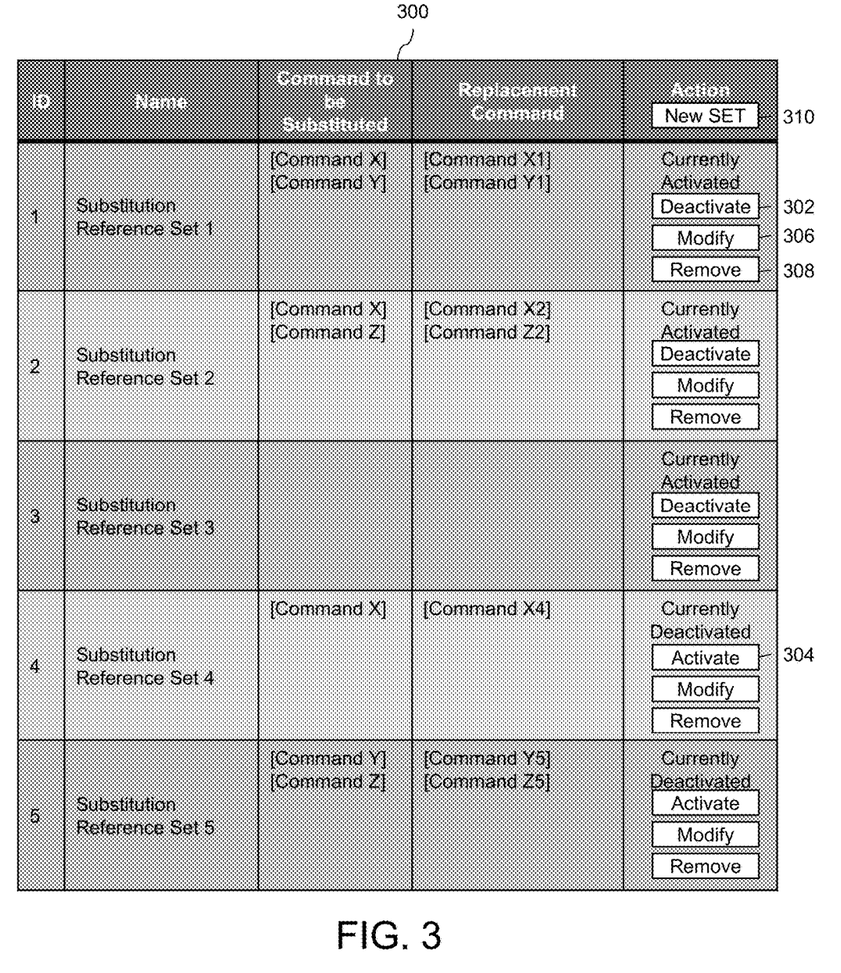
FIG. 3 illustrates management of substitution reference sets, in accordance with one or more implementations.

For example, FIG. 3 illustrate user interface 300 for management of substitution reference sets, in accordance with one or more implementations. As shown, substitution reference sets may indicate commands that are to be substituted and their respective replacement commands. An administrator may utilize user interface 300 to: deactivate an activated substitution reference set (e.g., substitution reference set 1 may currently be activated for a certain group of test users) using an associated button 302; activate a deactivated substitution reference set (e.g., substitution reference set 4 may not currently be applied to a client device 104) using an associated button 304; modify information associated with a substitution reference set (e.g., IDs, names, commands to be substituted, replacement commands, etc.) using an associated button 306; remove a substitution reference set from the collection of available substitution reference sets using an associated button 308; add a new substitution reference set to the collection of available substitution reference sets using associated button 310; and/or perform other functions with respect to the substation reference sets. In this way, user interface 300 enables an administrator to efficiently implement command changes (e.g., without having to hardcode the changes) by using user interface 300 to activate/deactivate substitution reference sets, modify substitution reference sets, remove substitution reference sets, add new substitution reference sets, etc.

In various implementations, substitution administration module 116 may be configured to receive inputs from the administrator to implement one or more of: deactivating of the first substitution reference set such that requested game commands at first client device 104 that match the first command may not be substituted with the second command; or deactivating of the second substitution reference set such that requested game commands at second client device 104 that match the first command may not be substituted with the third command. By way of example, with respect to FIG. 3, when an administrator deactivates substitution reference set 1, client devices 104 that were previously provided with substitution reference set 1 may be provided with substitution reference set 3 by reference implementation module 110 to replace substitution reference set 1 at those client devices 104. As shown, substitution reference set 3 does not indicate substituting of a command with a replacement command. As such, because substitution reference set 3 does not include any commands to be substituted, substitution of requested game commands at those client devices 104 may not occur since no matches may be found in substitution reference set 3.

By way of another example, with respect to FIG. 3, substitution reference set 3 may already be stored at particular client devices 104. For example, substitution reference set 3 and/or other substitution reference sets may preloaded on those client devices 104 prior to sale, stored on those client devices 104 when reference implementation module 110 previously provided the substitution reference sets to those client devices 104, and/or via other approaches. As such, in one use case, reference implementation module 110 may deactivate a currently-activated substitution reference set for a particular client devices 104 by causing those client devices 104 to replace the currently-activated substitution reference set with the stored substitution reference set 3.

Client device(s) 104 may be configured to execute one or more computer program modules. The computer program modules may be configured to enable an expert or user associated with the client device 104 to interface with system 100 and/or provide other functionality attributed herein to client device(s) 104. By way of example, the client device 104 may include one or more of a desktop computer, a laptop computer, a handheld computer, a netbook, a smartphone, a gaming console, and/or other computing devices. The computer program modules may include one or more of a game expression module 120, a command substitution manager module 122, a command initiation module 124, a substitution determination module 126, and/or other modules. Client devices(s) 104 may include an electronic storage 128 having electronic storage media that electronically stores information. For example, the electronic storage media may be non-transient electronic storage media storing individual substitution reference sets indicating substituting of game commands with replacement commands. In certain implementations, the substitution reference sets may be obtained from a network service, preloaded on the electronic storage media prior to sale of client device(s) 104, and/or stored via other approaches.

Game expression module 120 may be configured to execute an expression of a game. The game may include users associated with client devices. The users may include a first user associated with a first client device 104 and a second user associated with a second client device 104. By way of example, an instance of the game may be running on the server-side. The expression of the game may be running on the client-side at first client device 104. The expression may, for instance, be a version of the game instance running on the server side. The expression may receive information from the instance, such as information relating to a state of the game, information relating to future events in the game, and/or other information. The expression may react to information from the instance and user inputs received at first client device 104. Various results may be generated from such reaction and may be provided to the server-side, which may verify the results with the instance of the game.

Command substitution manager module 122 may be configured to obtain, at first client device 104, a first substitution reference set indicating substituting of a first command with a second command. A second substitution reference set at second client device 104 may indicate substituting of the first command with a third command. As indicated, the third command may be different from the second command.

Command initiation module 124 may be configured to initiate requests for implementation of game commands at first client device 104. By way of example, requests for implementation of game commands may be initiated in response to action requests inputted by users, action requests inputted automatically by the game, and/or other requests inputted via other approaches.

Substitution determination module 126 may be configured to substitute, based on the obtained first substitution reference set, a requested game command with the second command in response to the requested game command matching the first command. For example, when a request to implement a particular game command is initiated, a request message that includes the requested game command may be transmitted to substitution determination module 126 for processing. Substitution determination module 126 may, for instance, include a model view controller (MVC) that intercepts the request message and compares the requested game command in the message with to-be-substituted commands (e.g., the first command) indicated in the obtained first substitution reference set. The comparison may be performed via name matching and/or other comparison techniques. Two commands may, for instance, be determined to be a match if the comparison of the two commands results in similarities between the two commands that satisfy a certain predetermined similarity threshold.

In certain implementations, substitution determination module 126 may be configured to, in response to substituting the requested game command with the second command, forward the second command for implementing of the second command. By way of example, upon the matching determination, substitution determination module 126 may forward the second command to one or more appropriate modules (e.g., game expression module 120) within first client device 104 to implement the second command.

In various implementations, substitution determination module 126 may be configured to, in response to the requested game command not matching the first command, forward the requested game command for implementing of the requested game command. By way of example, upon the non-matching determination, substitution determination module 126 may forward the requested game command to one or more appropriate modules (e.g., game expression module 120) within first client device 104 to implement the requested game command.

Server(s) 102, client device(s) 104, external resources 130, and/or other components may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client device(s) 104, external resources 130, and/or other components may be operatively linked via some other communication media.

External resources 130 may include sources of information, hosts and/or providers of virtual spaces outside of system 100, external entities participating with system 100, and/or other resources. In some implementations, some or all of the functionality attributed herein to external resources 130 may be provided by resources included in system 100.

In some implementations, server(s) 102 may include an electronic storage 118, one or more processor(s) 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

In some implementations, the electronic storage media of electronic storages 118 and 128 may include one or both of system storage that is provided integrally (i.e., substantially non-removable) with server(s) 102 and/or client device(s) 104, and/or removable storage that is removably connectable to server(s) 102 and/or client device(s) via, for example, a port (e.g., a USB port, a firewire port, etc.) or a drive (e.g., a disk drive, etc.). Electronic storages 118 and 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storages 118 and 128 may include one or more virtual storage resources (e.g., cloud storage, a virtual private network, and/or other virtual storage resources). Electronic storages 118 and 128 may store software algorithms, information determined by processors 132 and 134, information received from server(s) 102, information received from client device(s) 104, information received from external resources 130, and/or other information that enables server(s) 102 or client device(s) 104 to function as described herein.

The processors 132 and 134 may be configured to provide information processing capabilities in server(s) 102 and client device(s) 104, respectively. As such, processors 132 and 134 may include one or more of a digital processor, an analog processor, a digital circuit designed to process information, an analog circuit designed to process information, a state machine, and/or other mechanisms for electronically processing information. Although processors 132 and 134 are shown in FIG. 1 as single entities, this is for illustrative purposes only. In some implementations, each of processors 132 and 134 may include a plurality of processing units. These processing units may be physically located within the same device, or processors 132 and 134 may individually represent processing functionality of a plurality of devices operating in coordination. The processors 132 and 134 may respectively be configured to execute modules 106, 108, 110, 112, 114, 116, 120, 122, 124, 126, and/or other modules by software; hardware; firmware; some combination of software, hardware, and/or firmware; and/or other mechanisms for configuring processing capabilities on processors 132 and 134.

It should be appreciated that although modules 106, 108, 110, 112, 114, and 116 are illustrated in FIG. 1 as being co-located within a single processing unit, in implementations in which processor(s) 132 includes multiple processing units, one or more of modules 106, 108, 110, 112, 114, and/or 116 may be located remotely from the other modules. Likewise, although modules 120, 122, 124, and 126 are illustrated in FIG. 1 as being co-located within a single processing unit, in implementations in which processor(s) 134 includes multiple processing units, one or more of modules 120, 122, 124, and/or 126 may be located remotely from the other modules. The description of the functionality provided by the different modules 106, 108, 110, 112, 114, 116, 120, 122, 124, and/or 126 described below is for illustrative purposes, and is not intended to be limiting, as any of modules 106, 108, 110, 112, 114, 116, 120, 122, 124, and/or 126 may provide more or less functionality than is described. For example, one or more of modules 106, 108, 110, 112, 114, 116, 120, 122, 124, and/or 126 may be eliminated, and some or all of its functionality may be provided by other ones of modules 106, 108, 110, 112, 114, 116, 120, 122, 124, and/or 126. As another example, processors 132 and 134 may individually be configured to execute one or more additional modules that may perform some or all of the functionality attributed below to one of modules 106, 108, 110, 112, 114, 116, 120, 122, 124, and/or 126.

Figure 4:
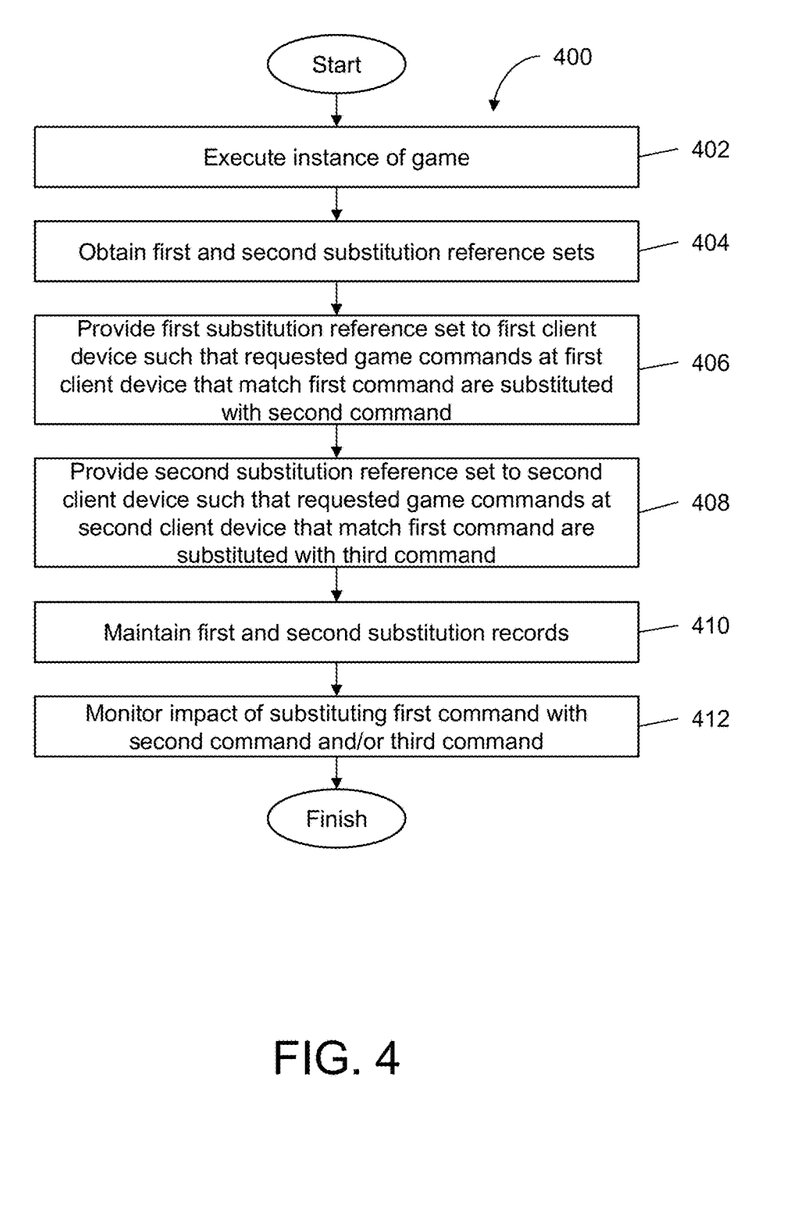
FIG. 4 illustrates a method for facilitating substitution of game commands with different replacement commands at client devices using substitution reference sets, in accordance with one or more implementations.

FIG. 4 illustrates a method for facilitating substitution of game commands with different replacement commands at client devices using substitution reference sets, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, an instance of a game may be executed. The game may include users associated with client devices. The users may, for instance, include a first user associated with a first client device 104 and a second user associated with a second client device 104. Operation 402 may be performed by a game module that is the same as or similar to game module 106, in accordance with one or more implementations.

At an operation 404, substitution reference sets that include first and second substitution reference sets may be obtained. The first substitution reference set may indicate substituting of a first command with a second command. The second substitution reference set may indicate substituting of the first command with a third command different from the second command. The first, second, and third commands may, for instance, relate to one or more features of the game. Operation 404 may be performed by a substitution reference manager module that is the same as or similar to substitution reference manager module 108, in accordance with one or more implementations.

At an operation 406, the first substitution reference set may be provided to first client device 104. Responsive to the first substitution reference set being provided to first client device 104, requested game commands at first client device 104 that match the first command may be substituted with the second command (e.g., based on the substitution indication in the first substitution reference set). Operation 406 may be performed by a reference implementation module that is the same as or similar to reference implementation module 110, in accordance with one or more implementations.

At an operation 408, the second substitution reference set may be provided to second client device 104. Responsive to the second substitution reference set being provided to second client device 104, requested game commands at second client device 104 that match the first command may be substituted with the third command (e.g., based on the substitution indication in the second substitution reference set). Operation 408 may be performed by a reference implementation module that is the same as or similar to reference implementation module 110, in accordance with one or more implementations.

At an operation 410, substitution records that include first and second substitution records may be maintained. The first substitution record may indicate that requested game commands at first client device 104 that match the first command are to be substituted with the second command. The second substitution record may indicate that requested game commands at the second device that match the first command are to be substituted with the third command. Operation 410 may be performed by a substitution record module that is the same as or similar to substitution record module 112, in accordance with one or more implementations.

At an operation 412, an impact of substituting the first command with one or more of the second command or the third command may be monitored. By way of example, the first and second client devices may be associated with a split test of one or more of the second command or the third command. In one scenario, for instance, an impact of the substitution may be monitored by collecting user response information from users associated with the first client device, the second client device, and/or other client devices to enable analysis of the split test. Operation 412 may be performed by an impact monitoring module that is the same as or similar to impact monitoring module 114, in accordance with one or more implementations.

Figure 5:
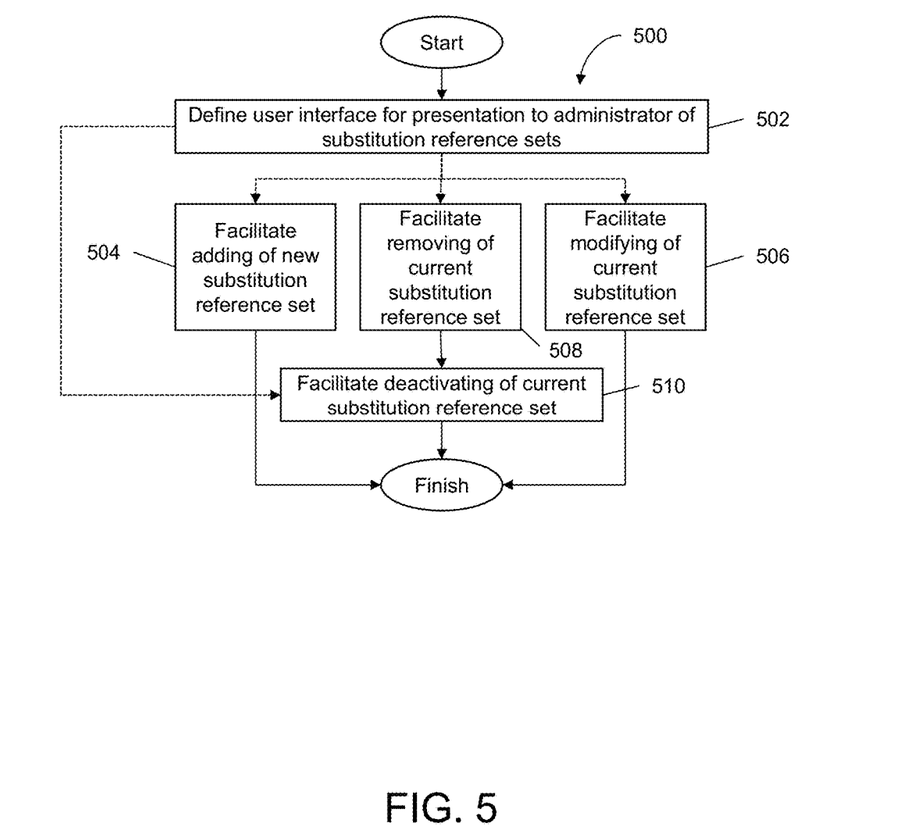
FIG. 5 illustrates a method for facilitating management of substitution reference sets, in accordance with one or more implementations.

FIG. 5 illustrates a method for facilitating management of substitution reference sets, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, a user interface for management of substitution reference sets may be defined for presentation to an administrator of the substitution reference sets. The user interface may, for instance, may be configured to enable the administrator to manage adding, modifying, removing, deactivating, activating, etc., of substitution reference sets to facilitate substitution of game commands with different replacement commands at client devices using substitution reference sets.

As an example, at an operation 504, adding of a new substitution reference set to a current collection of substitution reference sets may be facilitated through the user interface. The user interface may, for instance enable the administrator to select a name, commands to be substituted, replacements commands, and/or other options for the new substitution reference set.

As another example, at an operation 506, modifying of a current substitution reference set may be facilitated through the user interface. The user interface may, for instance, enable the administrator to view current substitution reference sets and to select various current substitution reference sets to modify.

As another example, at an operation 508, removing of a current substitution reference set may be facilitated through the user interface. The user interface may, for instance, enable the administrator to view current substitution reference sets and to select various substitution reference sets to remove. In some implementations, removing of the current substitution reference set may cause deactivating of the current substitution reference set, as shown by an operation 510. Upon deactivation, client devices provided with the current substitution reference set and actively using the current substitution reference set for command substitution may replace the current substitution reference set with a default substitution reference set that disables substitution of requested game commands.

In various implementations, operation 510 (e.g., the deactivation of the current substitution reference set) may be performed independently of the current substitution reference set being removed from a collection of current substitution reference sets. For example, the user interface may be utilized to facilitate such deactivation without removing the current applicable feature set so that the current substitution reference set may be reused by reactivating the current substitution reference set. Operations 502, 504, 506, 508, and/or 510 may be performed by a substitution administration module that is the same as or similar to substitution administration module 116, in accordance with one or more implementations.

Figure 6:
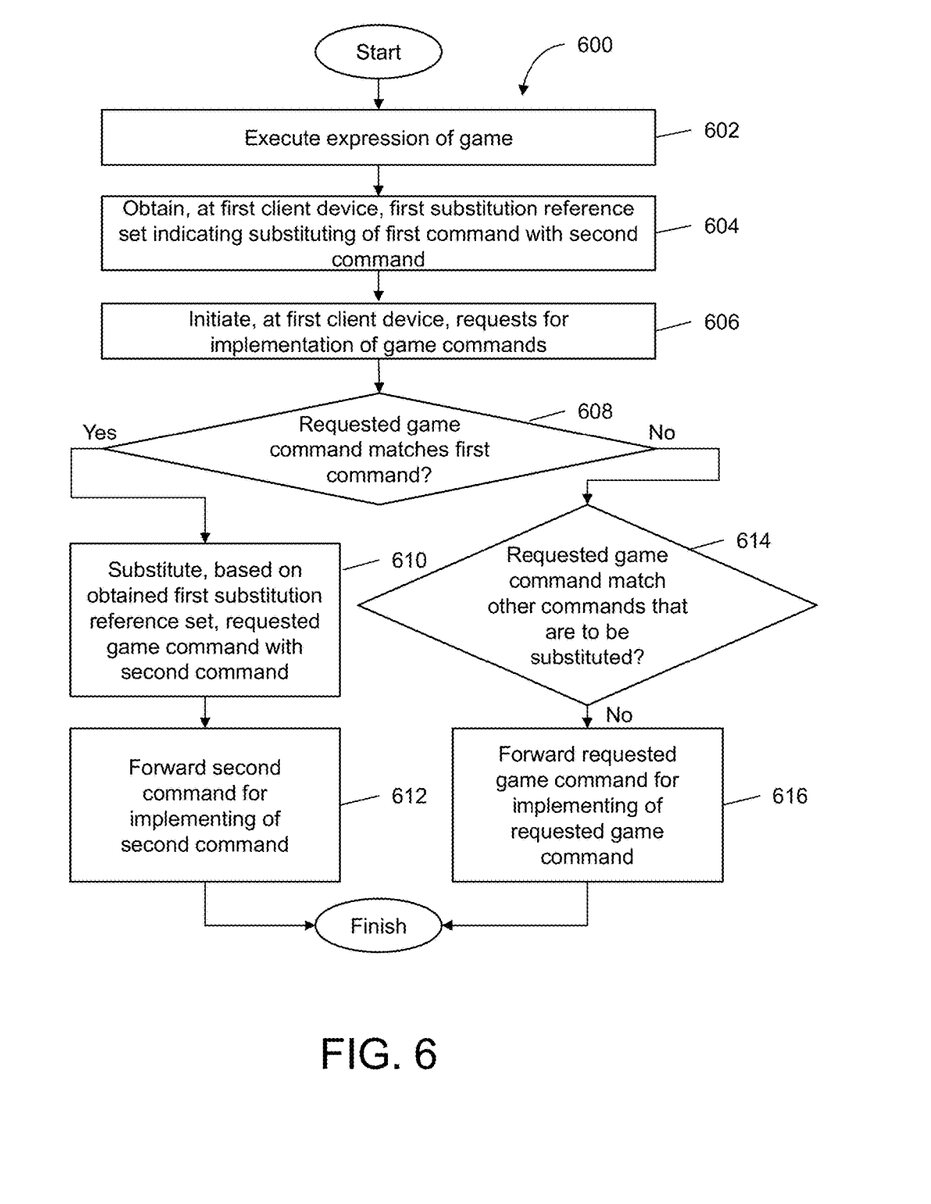
FIG. 6 illustrates a method for facilitating substitution of game commands at a client device based on a substitution reference set, in accordance with one or more implementations.

FIG. 6 illustrates a method for facilitating substitution of game commands at a client device based on a substitution reference set, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, an expression of a game may be executed. The game may include users associated with client devices. The users may include a first user associated with a first client device 104 and a second user associated with a second client device 104. Operation 602 may be performed by a game expression module that is the same as or similar to game expression 120, in accordance with one or more implementations.

At an operation 604, a first substitution reference set may be obtained at first client device 104. The first substitution reference set may indicate substituting of a first command with a second command. A second substitution reference set at second client device 104 may indicate substituting of the first command with a third command different from the second command. The first, second, and third commands may, for instance, relate to one or more features of the game. Operation 604 may be performed by a command substitution manager module that is the same as or similar to command substitution manager module 122, in accordance with one or more implementations.

At an operation 606, requests for implementation of game commands at first client device 104 may be initiated. Operation 606 may be performed by a command initiation module that is the same as or similar to command initiation module 124, in accordance with one or more implementations.

At an operation 608, a determination of whether a requested game command matches the first command may be effectuated. By way of example, such a determination may be performed via name matching and/or other comparison techniques. Two commands may, for instance, be determined to be a match if the comparison of the two commands results in similarities between the two commands that satisfy a certain predetermined similarity threshold. Operation 608 may be performed by a substitution determination module that is the same as or similar to substitution determination 126, in accordance with one or more implementations. Responsive to a determination that the requested game command matches the first command, the method 600 may proceed to an operation 610. Responsive to a determination that the requested game command does not match the first command, the method 600 may proceed to an operation 614.

At operation 610, the requested game command may be substituted with the second command based on the obtained first substitution reference set. Operation 610 may be performed by a substitution determination module that is the same as or similar to substitution determination 126, in accordance with one or more implementations.

At an operation 612, the second command may be forwarded for implementing of the second command. For example, the second command may be forwarded to an appropriate module (e.g., game expression module 120) within first client device 104 to implement the second command. Operation 612 may be performed by a substitution determination module that is the same as or similar to substitution determination 126, in accordance with one or more implementations.

At operation 614, a determination of whether the requested game command matches one or more other commands that are to be substituted may be effectuated. For example, the obtained first substitution reference set may indicate other commands that are to be substituted. Those other commands may be compared against the requested game command to determine whether a match exists. Operation 614 may be performed by a substitution determination module that is the same as or similar to substitution determination 126, in accordance with one or more implementations. Responsive to a determination that the requested game command does not match the one or more other to-be-substituted commands, the method 600 may proceed to an operation 616. In some implementations, responsive to a determination that the requested game command matches one of the other to-be-substituted commands, a respective replacement command of the matching to-be-substituted command may be forwarded to an appropriate module (e.g., game expression module 120) to implement the respective replacement command.

At an operation 616, the requested game command may be forwarded for implementing of the requested game command. For example, the requested game command may be forwarded to an appropriate module (e.g., game expression module 120) within first client device 104 to implement the requested game command. Operation 616 may be performed by a substitution determination module that is the same as or similar to substitution determination 126, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A system for facilitating substitution of commands with different replacement commands at client devices using substitution reference sets, the system comprising:
   one or more servers, the one or more servers comprising:
   non-transient electronic storage media storing individual substitution reference sets indicating substituting of server commands with replacement commands; and
   one or more processors configured by machine-readable instructions to:
   execute an application, and use the application to effectuate presentation of a user interface though which users interact with the application accessed via client devices by transmitting server commands to the client devices that define aspects of the user interface, the users including a first user associated with a first client device and a second user associated with a second client device;
   obtain the substitution reference sets from the non-transient electronic storage media, the substitution reference sets including a first substitution reference set and a second substitution reference set, wherein the first substitution reference set indicates substituting of a first server command with a second server command, and the second substitution reference set indicates substituting of the first server command with a third server command different from the second command; and
   provide the first substitution reference set to the first client device such that subsequently in response to reception of the first server command at the first client device, the first client device substitutes the second server command for the first server command and uses the second server command instead of the first server command to determine the user interface presented to the first user; and
   provide the second substitution reference set to the second client device such that subsequently in response to reception of the first server command at the second client device the second client device substitutes the third server command for the first server command and uses the third server command instead of the first server command to determine the user interface presented to the user.

2. The system of claim 1, wherein the one or more processors are configured by machine-readable instructions to maintain substitution records including first and second substitution records, wherein the first substitution record indicates that requested server commands at the first client device that match the first server command are to be substituted with the second server command, and the second substitution record indicates that requested server commands at the second device that match the first server command are to be substituted with the third server command.

3. The system of claim 1, wherein the one or more processors are configured by machine-readable instructions to monitor an impact of substituting the first server command with one or more of the second server command or the third server command.

4. The system of claim 1, wherein the first and second client devices are associated with a split test of one or more of the second server command or the third server command.

5. The system of claim 1, wherein the one or more processors are configured by machine-readable instructions to receive inputs from an administrator to implement one or more of adding of a new substitution reference set to the substitution reference sets, modifying of the first substitution reference set, modifying of the second substitution reference set, removing of the first substitution reference set from the substitution reference sets, or removing of the second substitution reference set from the substitution reference sets.

6. The system of claim 5, wherein the one or more processors are configured by machine-readable instructions to define a user interface for presentation to the administrator of the substitution reference sets, the user interface being configured to receive entry and/or selection of inputs that effectuate one or more of the adding of the new substitution reference set, the modifying of the first substitution reference set, the modifying of the second substitution reference set, the removing of the first substitution reference set, or the removing of the second substitution reference set.

7. The system of claim 5, wherein the one or more processors are configured by machine-readable instructions to receive inputs from the administrator to implement one or more of: deactivating of the first substitution reference set such that requested server commands at the first client device that match the first server command are not substituted with the second server command; or deactivating of the second substitution reference set such that requested server commands that match the first server command are not substituted with the third server command.

8. A method for facilitating substitution of server commands with different replacement server commands at client devices using substitution reference sets, the method being implemented in a server in communication with the client devices, the server including one or more processors configured by machine-readable instructions, the method comprising:

executing an application, and use the application to effectuate presentation of a user interface though which users interact with the application accessed via client devices, by transmitting server commands to the client devices that define aspects of the user interface the users including a first user associated with a first client device and a second user associated with a second client device;

obtaining the substitution reference sets including a first substitution reference set and a second substitution reference set, wherein the first substitution reference set indicates substituting of a first server command with a second server command, and the second substitution reference set indicates substituting of the first server command with a third server command different from the second server command;

providing the first substitution reference set to the first client device such that in response to reception of the first server command at the first client device, the first client device substitutes the second server command for the first server command; and providing the second substitution reference set to the second client device such that subsequently in response to reception of the first server command at the second client device the second client device substitutes the third server command for the first server command and uses the third server command instead of the first server command to determine the user interface presented to the second user.

9. The method of claim 8, comprising maintaining substitution records including first and second substitution records, wherein the first substitution record indicates that requested server commands at the first client device that match the first server command are to be substituted with the second server command, and the second substitution record indicates that requested server commands at the second device that match the first server command are to be substituted with the third server command.

10. The method of claim 8, comprising monitoring an impact of substituting the first server command with one or more of the second server command or the third server command.

11. The method of claim 8, wherein the first and second client devices are associated with a split test of one or more of the second server command or the third server command.

12. The method of claim 8, comprising receiving inputs from an administrator to implement one or more of adding of a new substitution reference set to the substitution reference sets, modifying of the first substitution reference set, modifying of the second substitution reference set, removing of the first substitution reference set from the substitution reference sets, or removing of the second substitution reference set from the substitution reference sets.

13. The method of claim 12, comprising defining a user interface for presentation to the administrator of the substitution reference sets, the user interface being configured to receive entry and/or selection of inputs that effectuate one or more of the adding of the new substitution reference set, the modifying of the first substitution reference set, the modifying of the second substitution reference set, the removing of the first substitution reference set, or the removing of the second substitution reference set.

14. The method of claim 12, comprising receiving inputs from the administrator to implement one or more of: deactivating of the first substitution reference set such that requested server commands at the first client device that match the first server command are not substituted with the second server command; or deactivating of the second substitution reference set such that requested server commands at the second client device that match the first server command are not substituted with the third server command.

* * * * *